United States Patent [19]
Goff

[11] Patent Number: 5,736,829
[45] Date of Patent: Apr. 7, 1998

[54] HIGH-SPEED CONSTANT-HORSEPOWER MOTOR

[75] Inventor: Jerry K. Goff, Doylestown, Pa.

[73] Assignee: Performance Controls, Inc., Horsham, Pa.

[21] Appl. No.: 389,570

[22] Filed: Feb. 16, 1995

Related U.S. Application Data

[63] Continuation-in-part of Ser. No. 284,234, Aug. 2, 1994, abandoned.

[51] Int. Cl.$^6$ .................................................. H02P 1/48
[52] U.S. Cl. ........................... 318/704; 318/496; 318/524
[58] Field of Search ................................. 318/785, 704, 318/773, 521–524, 495–496, 498, 736, 254, 439, 721–724, 529; 310/156, 177, 180, 184–185, 187, 208–209, 210–212

[56] References Cited

U.S. PATENT DOCUMENTS

| | | | |
|---|---|---|---|
| 3,599,069 | 8/1971 | Welch | 318/254 |
| 3,611,082 | 10/1971 | Schmitz . | |
| 3,802,066 | 4/1974 | Barrett | 310/42 X |
| 4,079,446 | 3/1978 | Hertz | 310/189 X |
| 4,152,630 | 5/1979 | Wanlass | 318/746 |
| 4,217,508 | 8/1980 | Uzuka | 310/46 |
| 4,221,999 | 9/1980 | Gausman | 318/704 |
| 4,513,237 | 4/1985 | Ford | 318/768 |
| 4,866,364 | 9/1989 | Chiarion | 318/704 |
| 4,874,975 | 10/1989 | Hertrich | 310/186 |
| 5,216,343 | 6/1993 | Genheimer et al. | 318/785 X |
| 5,350,927 | 9/1994 | Veki | 318/254 X |

*Primary Examiner*—David S. Martin
*Attorney, Agent, or Firm*—William H. Eilberg

[57] ABSTRACT

A high-speed constant-horsepower motor includes a rotor and a stator having a plurality of groups of windings which are separately driven. In one mode of operation, the polarity of the voltage applied to each winding is such that the windings behave as distinct electromagnets, each defining a separate magnetic pole. In another mode of operation, the polarity of voltage applied to some of the windings is reversed, such that pairs of adjacent windings behave as single electromagnets. In the latter mode, the effective number of magnetic poles is reduced by a factor of two. Thus, the effective number of magnetic poles of the motor can be varied electronically, even while the motor is operating. The invention makes it possible, in one example, to operate the motor as an eight-pole motor at low speeds, and as a four-pole motor at high speeds. The effective motor constants are changed appropriately from eight-pole to four-pole modes. The invention also includes a circuit which minimizes the number of slip rings, or other power transferring devices, required to implement the above-described invention on the windings of the rotor.

14 Claims, 10 Drawing Sheets

WYE CONNECTION

DELTA CONNECTION

FIG 9

PRIOR ART

PARALLEL CONNECTION

SERIES CONNECTIONS

FIG 10
PRIOR ART

HIGH-SPEED CONSTANT-HORSEPOWER MOTOR

CROSS-REFERENCE TO PRIOR APPLICATION

This is a Continuation-In-Part of application Ser. No. 08/284,234, filed Aug. 2, 1994 now abandoned.

BACKGROUND OF THE INVENTION

This invention relates to the field of electric motors. In particular, the invention provides a brushless motor having a generally constant power output over a very wide range of speeds.

A brushless motor contains a plurality of windings, arranged on the rotor and/or stator, the windings defining a plurality of electromagnets. Depending on the polarity of voltage applied to the windings, the electromagnets can define varying numbers of effective magnetic poles. For an eight-pole motor, i.e. one having four pole pairs, a rotation of 360 electrical (or magnetic) degrees corresponds to 90° of mechanical rotation. For a four-pole motor, i.e. one having two pole pairs, a rotation of 360 electrical (or magnetic) degrees corresponds to 180° of mechanical rotation.

Increasing the number of magnetic poles in a brushless motor increases the available torque at low speeds, but at higher speeds, the need for rapid commutation of the windings causes switching losses which offset the advantage obtained from the increase in speed. If the motor is to be operated at a wide variety of speeds, the performance of the motor will not always be optimal unless the number of magnetic poles can be changed for different speed domains.

Providing a motor with windings having a large number of magnetic poles is analogous to providing a transmission in "low gear". Conversely, providing a motor with windings having a reduced number of magnetic poles is analogous to providing a transmission in "high gear". If the number of magnetic poles is fixed, the result is comparable to providing a transmission which has only one gear ratio setting.

Similarly, the motor constants also affect motor speed in a practical application. The power sources providing voltage to commutate the brushless motor, and current to generate torque, will have definite voltage and current capabilities and limitations. Again, a shift of gears, or, in this case, motor torque and back emf constants, is required to keep the motor operating within the available voltage and current capability of the power supply and commutation circuitry. The same electrical mechanism that provides for the shift from eight poles to four effects the change in basic motor constants. The change in motor constant is 4:1. This means that a given current level generates four times the torque with four pole operation, as compared to eight pole operation, permitting high torque generation at lower speeds to maintain constant horsepower. Conversely, a given maximum voltage will support approximately four times the speed for eight pole operation, as compared to four pole operation, and this exceeds the speed range where back emf limitations are more important than torque. Combining this with a 2.5:1 change resulting from field weakening allows the motor to operate effectively over a range of 10:1 in speed while maintaining optimum efficiency.

Figure 9:
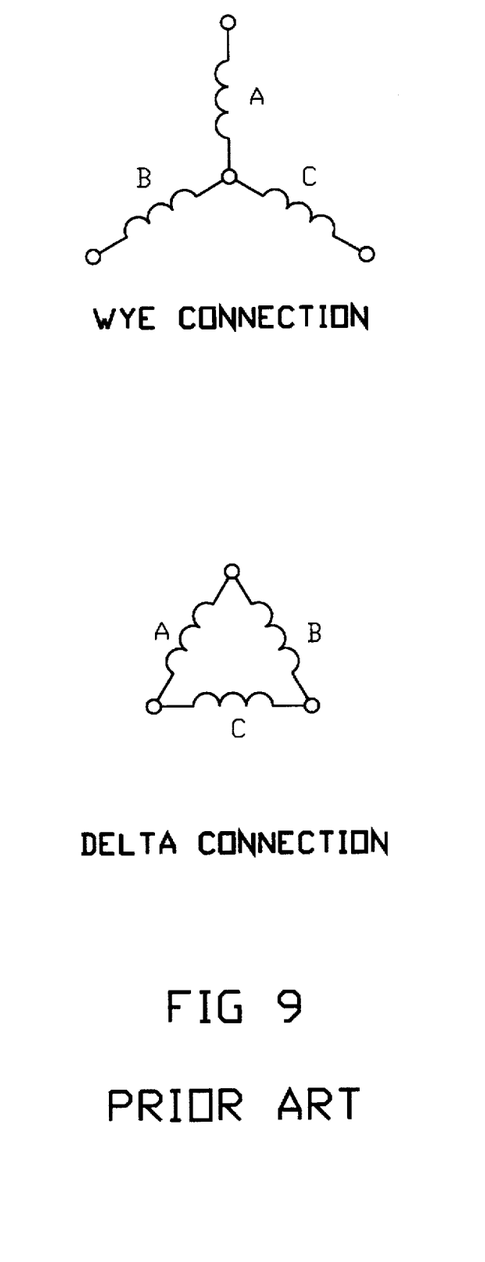
FIG. 9 illustrates the Wye and Delta connections used in the prior art, to adjust torque and back emf constants.
Figure 10:
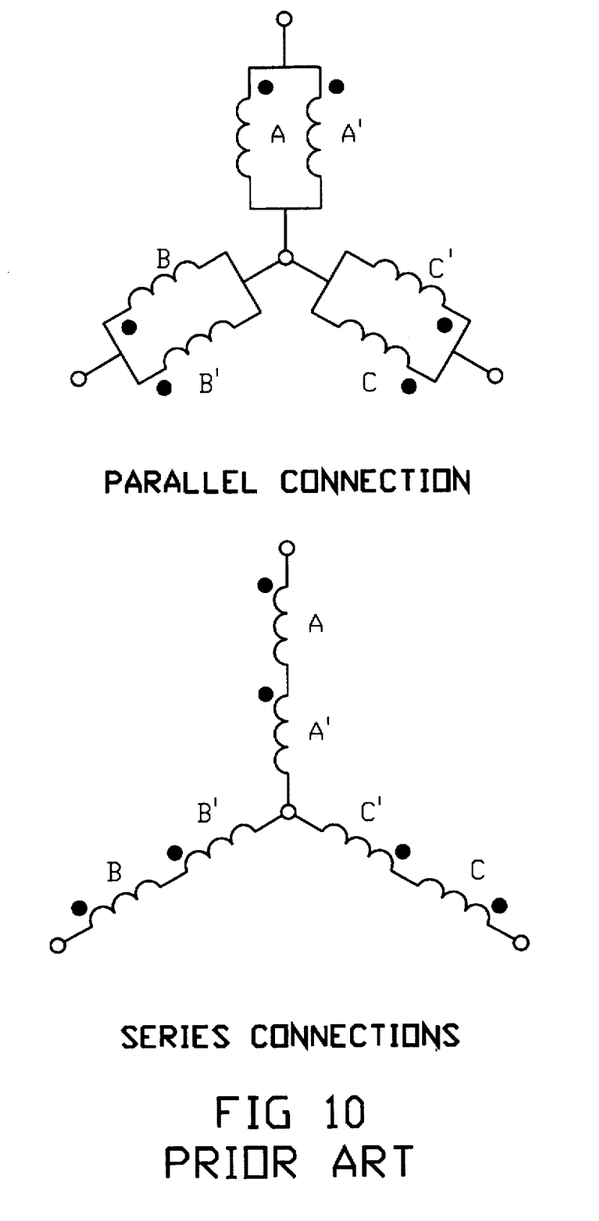
FIG. 10 illustrates the parallel and series connections of motor windings, in the prior art, to adjust torque and back emf constants.

Unfortunately, in the prior art, it has not been possible to provide a practical "gear change" for a brushless motor. Motors have been developed which use the Wye and Delta connections to obtain a change of 1.7:1 in torque and back emf constants. FIG. 9 illustrates such connections. Also, a switch from series to parallel winding connections will provide a 2:1 change in torque and back emf constants. FIG. 10 illustrates such prior art arrangement of the motor windings. However, both of the above-described configuration changes require complex extra switching, which is unlikely to be accomplished during full power motor operation.

An actual mechanical gearing arrangement is not a viable option in high speed brushless motors because gears wear rapidly at high speeds. Moreover, it would be necessary to stop the motor to change gears. Gears add to the expense of the system, and are very inefficient. They also tend to generate mechanical impulses that can interfere with the operation of an electronic motor drive system.

The present invention provides a purely electronic and non-mechanical means of varying the effective number of magnetic poles in a brushless motor. The invention enables the motor to be operated most advantageously at both high and low speeds, and makes it possible to change the effective number of poles even while the motor is in operation.

SUMMARY OF THE INVENTION

In the preferred embodiment, the brushless motor of the present invention has a stator which is driven in three phases, each phase corresponding to a separate group of windings. Within each phase, some of the windings are driven by a first voltage source, and the remaining windings are driven by a second voltage source. The first and second voltage sources comprise electrical signals that have the effect of controlling the direction of current flow through the various windings. In particular, the electrical signals are configured such that the direction of current flow through selected windings can be changed relative to the direction of current flow through the other windings. Changing the polarity of the voltage applied to each winding changes the direction of current flow through the winding, and thus changes the direction of the magnetic field produced by the winding.

In one configuration of the applied electrical signals, each winding behaves as a separate magnet, and the effective number of magnetic poles in one of the phases is the same as the number of windings in that phase. In a second configuration of the applied electrical signals, the polarity of the voltage applied to selected windings in a given phase is reversed, and the orientations of the windings are such that certain adjacent pairs of windings become magnetically equivalent to a single winding. The result is that the effective number of magnetic poles in that phase is reduced by one-half.

Thus, by changing the polarity of the voltage applied to some of the windings, the effective number of poles in a phase of the stator can be changed. The polarity is preferably changed by electronic means, such as by driving the windings with pulses having the desired polarities. A similar technique is used for the other phases.

The rotor also has a plurality of windings, and the polarities of the voltages applied to these windings are changed, in the same manner described above, to vary the effective number of poles in the rotor. The windings of the rotor are connected to the sources of voltage through slip rings, or through some other mode of transferring voltage to the rotor such as that of transformer action.

The invention also includes a circuit which minimizes the number of slip rings required. The arrangement of rotor windings is such that the polarity of a first group of windings must be reversed when changing the effective number of poles, while the polarity of a second group of windings must remain unchanged. The windings of the first group are connected directly to a pair of slip rings. The windings of the second group are connected to a diode bridge rectifier circuit, which itself is connected to the same slip rings. The rectifier circuit insures that the polarity of voltage applied to the second group remains unchanged, even while the polarity of voltage applied to the first group is reversed. As a result, one achieves the desired magnetic effects in the windings, but requires only two slip rings to provide the necessary voltages to the windings to achieve such effects.

The invention can be practiced with various numbers of phases, and with various types of waveforms for driving the windings.

The present invention therefore has the primary object of providing a high-speed constant-horsepower motor.

The invention has the further object of providing a brushless motor in which the number of effective magnetic poles defined by a set of windings can be varied electronically.

The invention has the further object of providing a motor that can deliver a relatively constant power output through a wide range of speeds.

The invention has the further object of eliminating the need for mechanical gearing devices in a high-speed constant-horsepower motor.

The invention has the further object of providing a constant-horse-power motor in which the effective number of poles of the rotor and stator can be changed while the motor is operating.

The invention has the further object of providing a constant-horse-power motor having a rotor formed with windings, wherein the windings are connected to a power source by slip rings, and wherein the number of slip rings is minimized.

The invention has the further object of providing a purely electronic method of varying the effective number of magnetic poles of a brushless motor.

The person skilled in the art will recognize other objects and advantages of the present invention, from a reading of the following brief description of the drawings, the detailed description of the invention, and the appended claims.

DETAILED DESCRIPTION OF THE INVENTION

Figure 1:
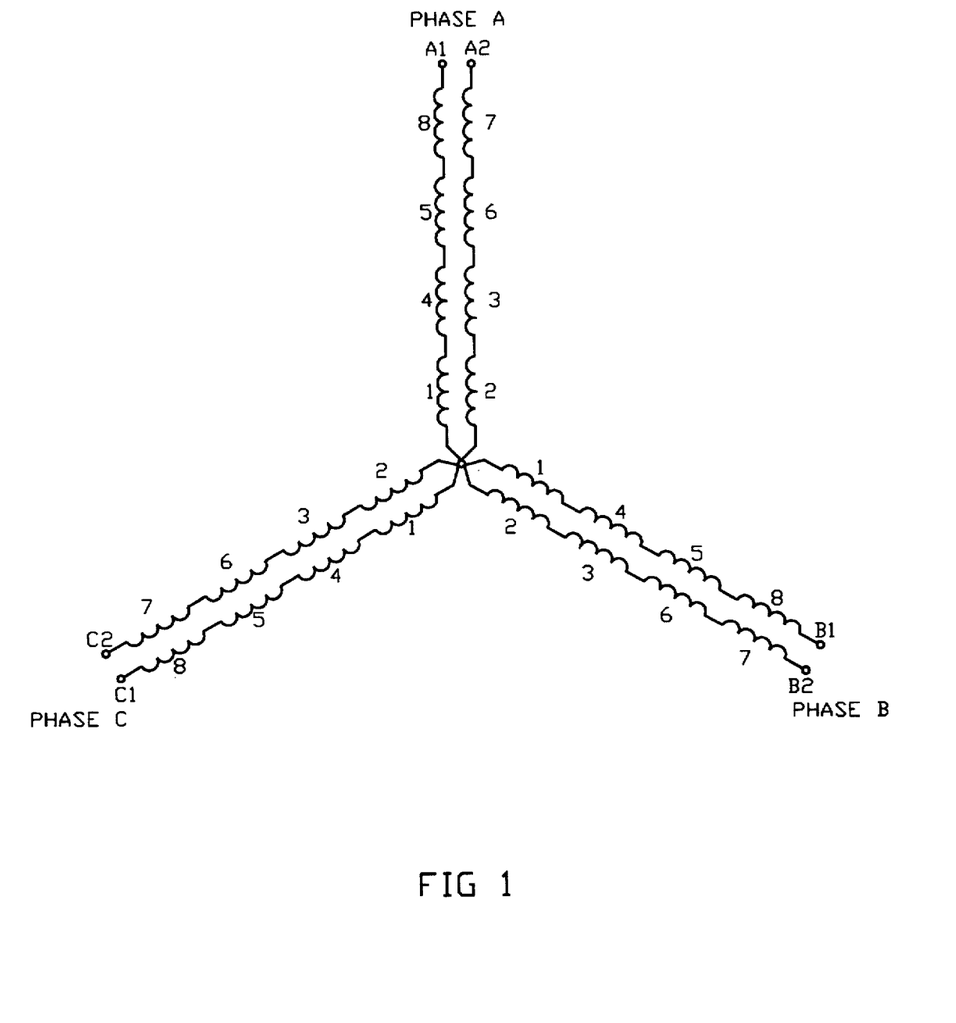
FIG. 1 provides a schematic diagram of the stator windings of a three-phase constant-horsepower motor constructed according to the present invention.

FIG. 1 provides a schematic diagram showing the windings of the stator of a high-speed constant-horsepower motor, according to a preferred embodiment of the invention. In this embodiment, the stator has three phases, designated Phase A, Phase B, and Phase C. The invention is not limited to a particular number of phases, however. In the embodiment shown, the stator has 24 slots to accommodate windings, and each phase occupies eight slots. The invention is not limited to a particular number of slots; many other arrangements are within the scope of the invention.

The eight windings of each phase are labeled by numerals 1 through 8. Windings 1, 4, 5, and 8 of each phase are driven by signals applied at terminals A1, B1, and C1, as shown. Windings 2, 3, 6, and 7 of each phase are driven by signals applied at terminals A2, B2, and C2. For simplicity, all of the phases have a common connection, as shown.

Figure 2:
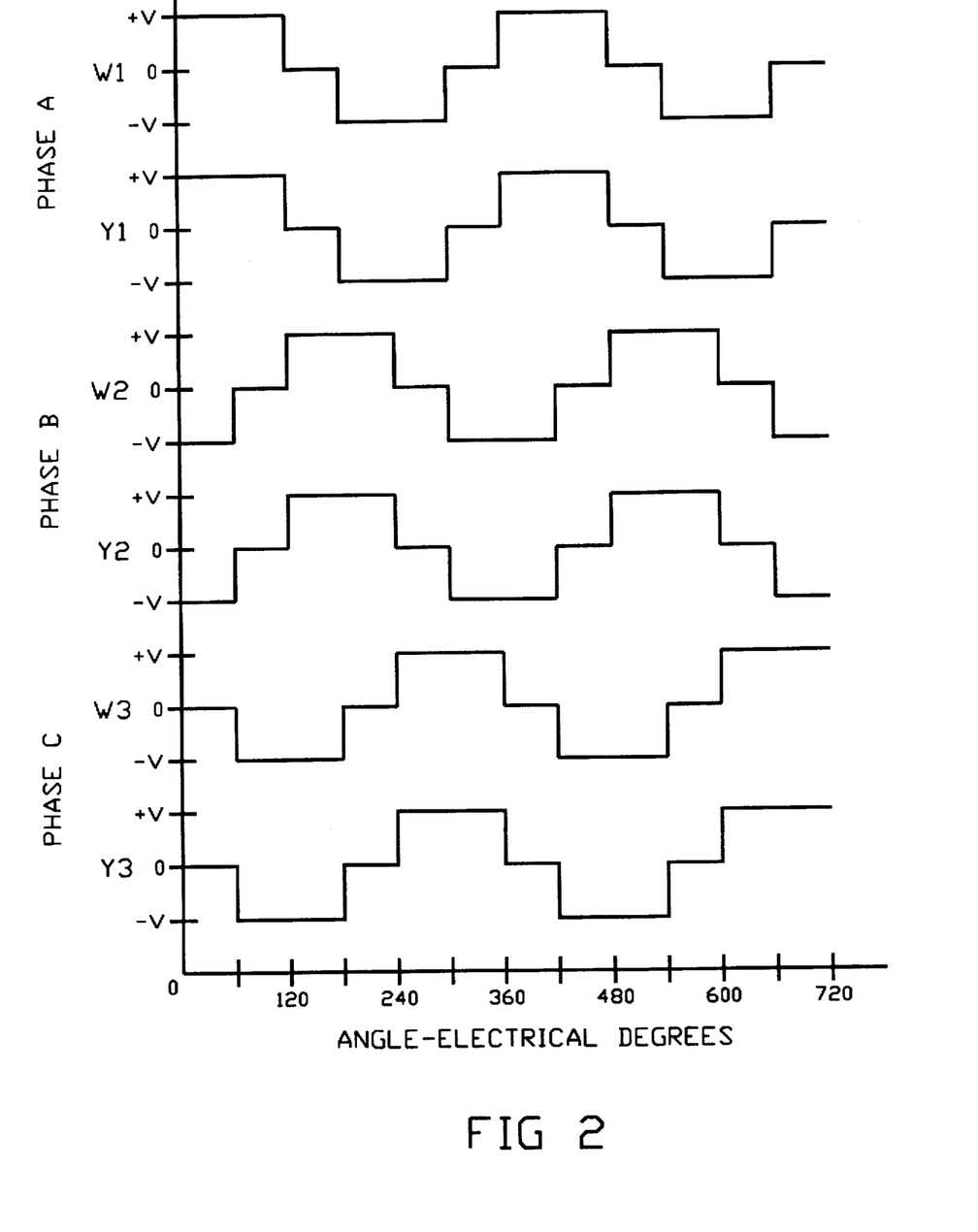
FIG. 2 provides pulse diagrams showing the signals used to drive the stator windings of FIG. 1, when each phase is operated in the eight-pole mode.

FIG. 2 provides pulse diagrams showing the signals applied to terminals A1, A2, B1, B2, C1, and C2, of FIG. 1, for the case of eight-pole operation. In this case, the signals applied to each pair of terminals associated with a given phase (such as A1 and A2) are the same. Of course, the signals applied to different phases are time-displaced relative to the signals for Phase A. FIG. 2 shows the signals as stepped pulses; the pulses can be generated by any conventional means (not shown). FIG. 2 shows the signals through two complete electrical cycles, i.e. 720 electrical degrees. When the windings are driven in this manner, each winding of each phase acts as an electromagnet having a distinct pole ("north" or "south"), and the poles of adjacent electromagnets have opposite magnetic polarity. Therefore, the windings of each phase behave as a plurality of electromagnets having eight poles (four pole-pairs).

Figure 3:
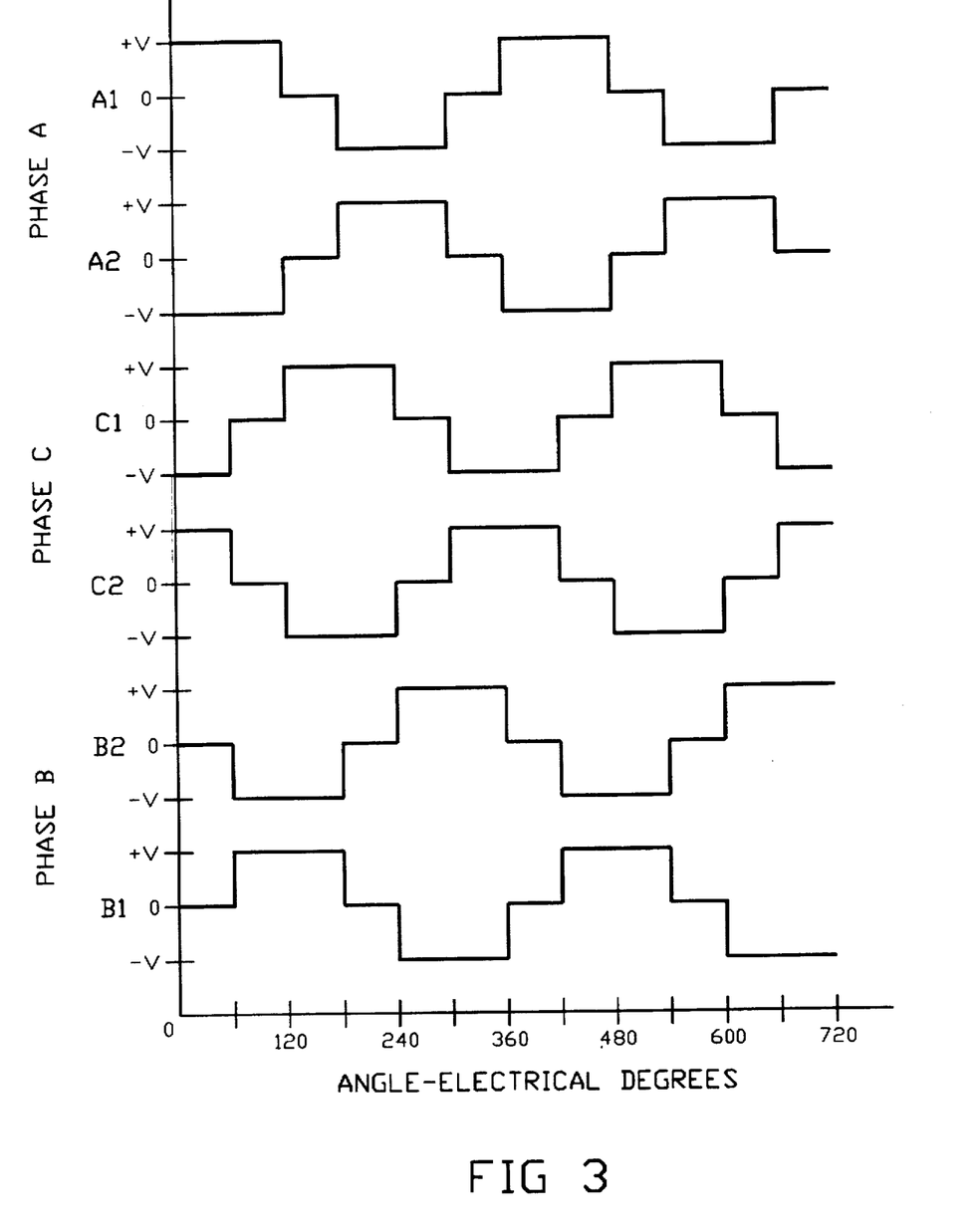
FIG. 3 provides pulse diagrams showing the signals used to drive the stator windings of FIG. 1, when each phase is operated in the four-pole mode.

FIG. 3 provides a pulse diagram showing how the stator windings are driven in the case of four-pole operation. In this case, the voltages applied to the two terminals of a given phase are of inverted polarity relative to each other. For example, the voltage applied at terminal A1 is the inverse of the voltage applied at terminal A2. The same relationship applies to the terminal pairs B1 and B2, and C1 and C2. Note that, in this mode of operation, the signals applied to A1, B1, and C1 remain unchanged from those of FIG. 2, while the signals applied to A2, B2, and C2 have been inverted.

In the arrangement of FIG. 3, the windings are driven such that pairs of windings behave as a single electromagnet. Thus, instead of having electromagnets defining eight poles for each phase, there are now effectively four poles (two pole-pairs). The reduction of poles by a factor of two comes at the expense of forming each electromagnet with twice the number of windings that would be otherwise used, but this additional use of wire does not seriously impair performance of the system.

When switching from eight-pole to four-pole operation, it is necessary, in general, to provide an additional phase shift between the drive signals, shown in FIG., and the actual position of the motor shaft. The amount of such phase shift can vary, as will be appreciated by persons skilled in the art.

Figure 4:
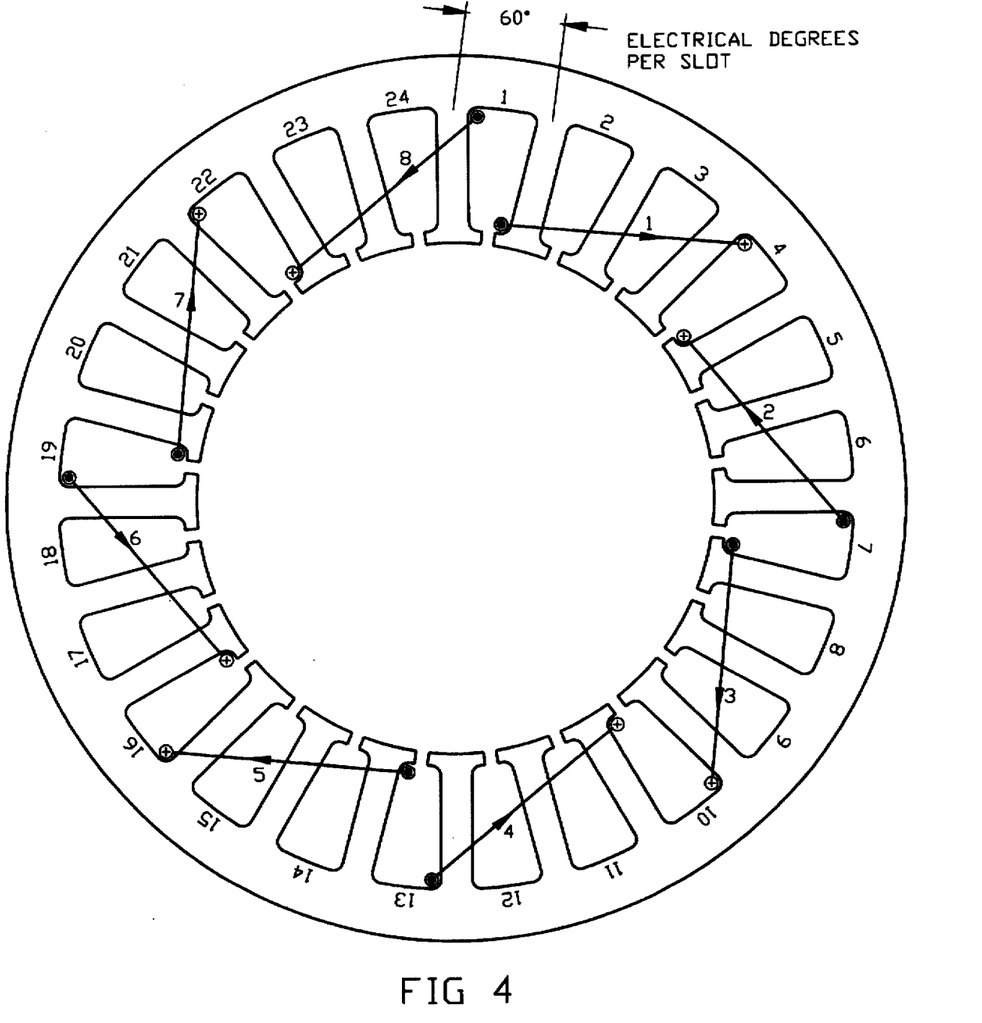
FIG. 4 provides a partially-schematic diagram showing the physical arrangement of windings of one phase of the stator, when operated in the eight-pole mode.
Figure 5:
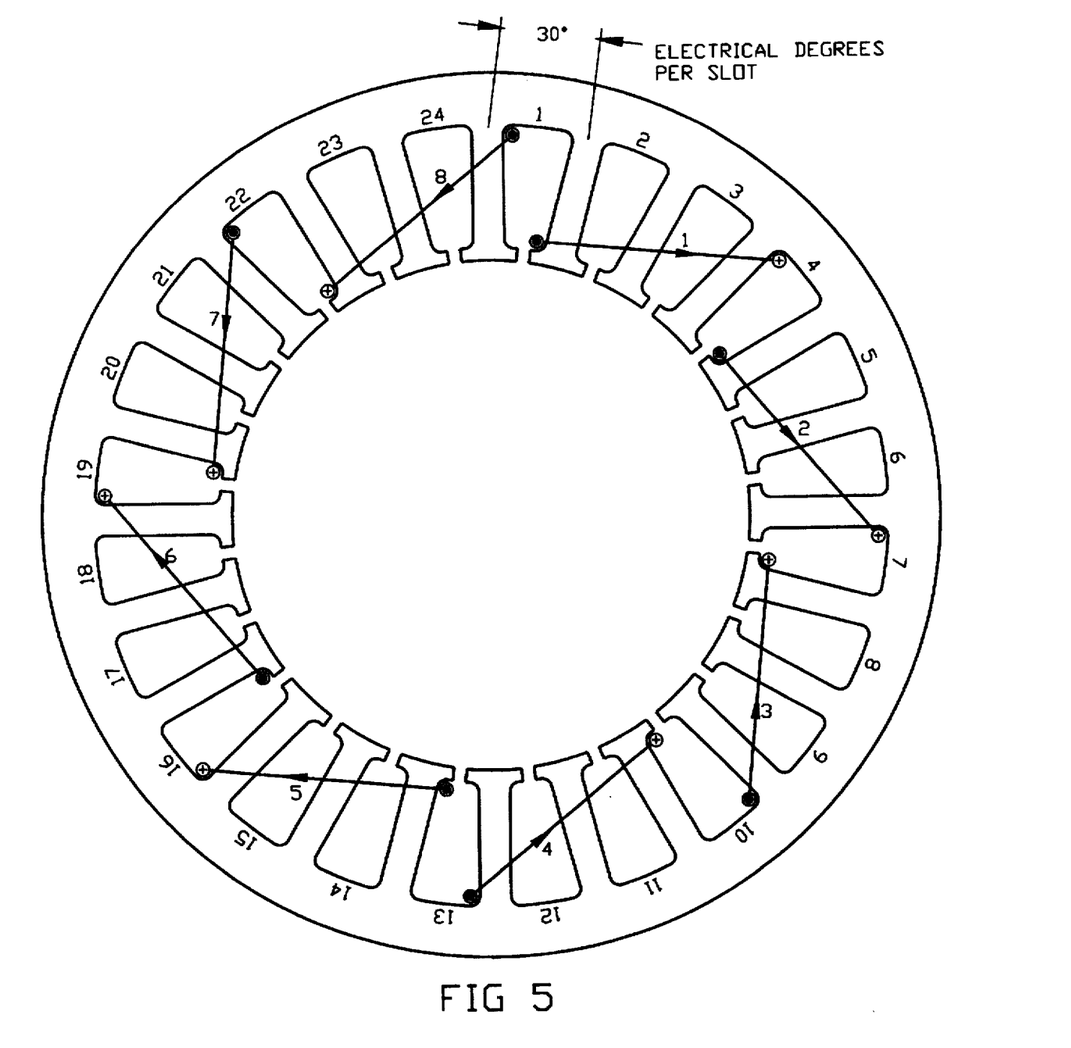
FIG. 5 provides a diagram similar to FIG. 4, for the case of operation in the four-pole mode.

FIGS. 4 and 5 show the arrangement of windings in the slots of the stator, for the cases of eight-pole and four-pole operation, respectively. These figures represent a winding with encircled dots and encircled crosses, connected by a line. The encircled dot indicates that current flowing in the winding is coming out of the plane of the paper, towards the reader, while the encircled cross indicates that the current is going into the paper, away from the reader. For the sake of clarity of explanation, only the windings of Phase A are shown. The slots are numbered consecutively from 1 to 24, and the windings are numbered from 1 to 8, corresponding to FIG. 1. Note that winding 1 spans slots 1–4, winding 2 spans slots 4–7, winding 3 spans slots 7–10, etc. The windings for the three phases would be interleaved with each other. Thus, winding 1 of Phase B (not shown) could span slots 2–5, winding 2 of Phase B could span slots 5–8, etc. Similarly, winding 1 of Phase C (not shown) could span slots 3–6, winding 2 of Phase C could span slots 6–9, etc.

The direction of the currents in the windings, resulting from the applied voltages indicated in FIGS. 2 and 3, determines the behavior of the windings as electromagnets. In FIG. 4, the current in each winding, at each slot, flows in the same direction as the current in the adjacent winding, at the same slot. Stated another way, the encircled symbols at each slot are of the same type, either both dots or both crosses. This condition implies that each winding behaves as an electromagnet having a magnetic pole which is different from the poles of the electromagnets nets defined by the adjacent windings. The result is that the stator effectively comprises eight magnetic poles.

In FIG. 5, the current in each winding, at some of the slots, flows in the opposite direction relative to the current in the adjacent winding, at the same slot. In other words, the encircled symbols at slots 4, 10, 16, and 22 are of opposite types (one dot and one cross), while the encircled symbols at slots 1, 7, 13, and 19 are of the same type (both dots or both crosses). This condition implies, for example, that windings 1 and 2 together effectively define one electromagnet. Similarly, windings 3 and 4, windings 5 and 6, and windings 7 and 8 all define single electromagnets. Therefore, the stator effectively has four poles instead of eight. Note that the effective boundary between electromagnets occurs at those slots at which the encircled symbols are the same (both dots or both crosses).

The arrangements of FIGS. 4 and 5 are selected electronically, by driving the windings using the signals of either FIG. 2 or FIG. 3, respectively. In FIG. 4, each slot defines 60 electrical degrees, while in FIG. 5, each slot defines 30 electrical degrees. The physical appearance of the motor does not change during a change between four-pole and eight-pole modes. The only change is in the waveforms of the electronic signals used to drive the windings. This is an important advantage over series/parallel or delta/wye switching which is more complex and makes less efficient use of the solid state switching.

The invention is not limited to the waveforms shown in FIGS. 2 and 3, which divide the 360° cycle into six intervals. One could instead provide a stepped waveform which divides each cycle into some other number of intervals. Also, one could use other types of waveforms, such as sinusoids or sawtooths. What is important is that the polarity relationships between pairs of signals (such as between A1 and A2) be maintained. For example, if a sinusoid were used, then for four-pole operation, the signals applied at terminals A1 and A2 would be sinusoids that are 180° out of phase.

In the example of FIGS. 2 and 3, the signals applied to terminals A1, B1, and C1 are not changed when switching between four-pole and eight-pole modes, while the signals applied to terminals A2, B2, and C2 are changed. However, one could also devise other arrangements, in which, depending on the physical orientation of the windings, all of the signals might need to be changed during a change in mode. What is important is that, in the reduced-pole mode, pairs of adjacent windings must be driven such that they behave as single electromagnets. The invention is not limited to any one of these embodiments.

In the notation of FIGS. 2 and 3, the maximum values of the signals applied to the windings are shown as +V and −V. Thus, the bus voltage is defined as 2V.

Figure 6A:
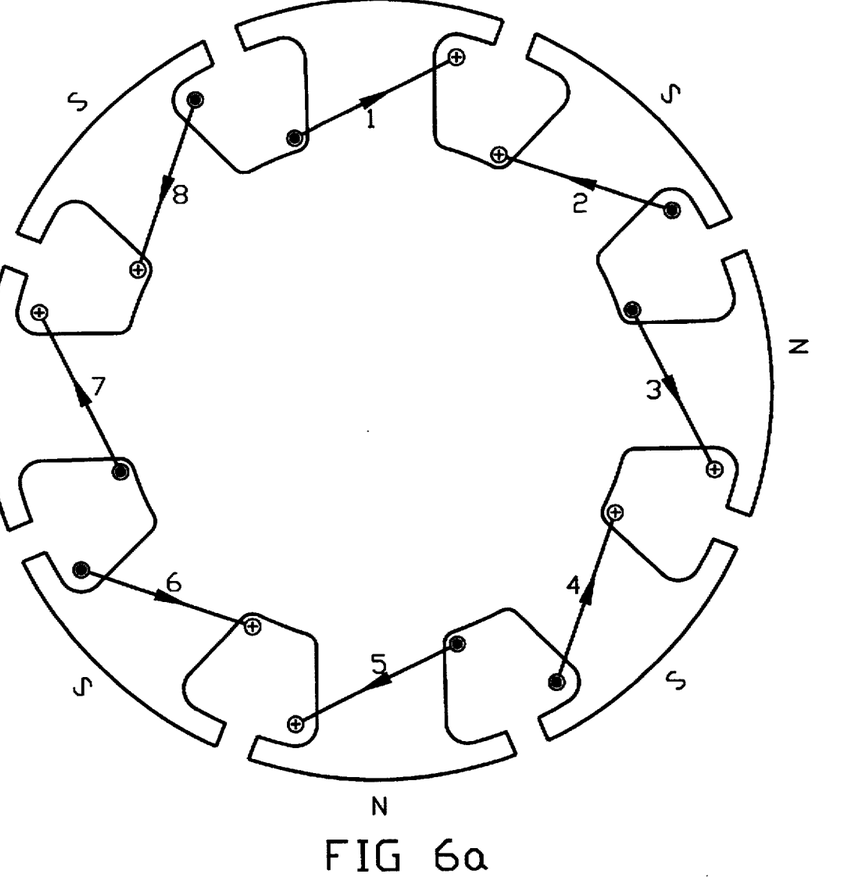
FIG. 6a provides a partially-schematic diagram showing the physical arrangement of windings of the rotor, when operated in an eight-pole mode.
Figure 6B:
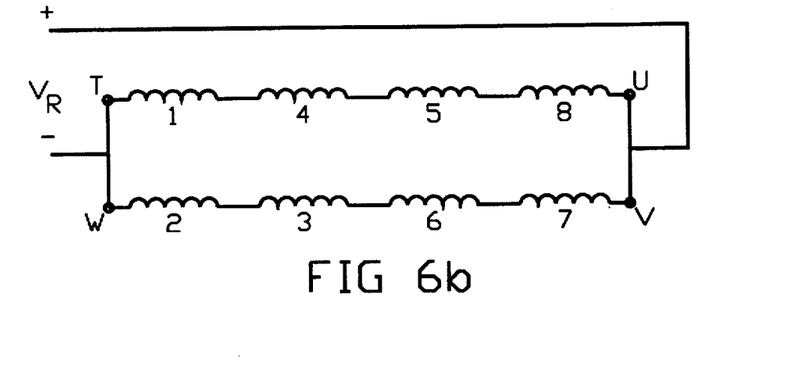
FIG. 6b provides a schematic diagram showing the connection of voltage to the rotor windings, for eight-pole operation.
Figure 7A:
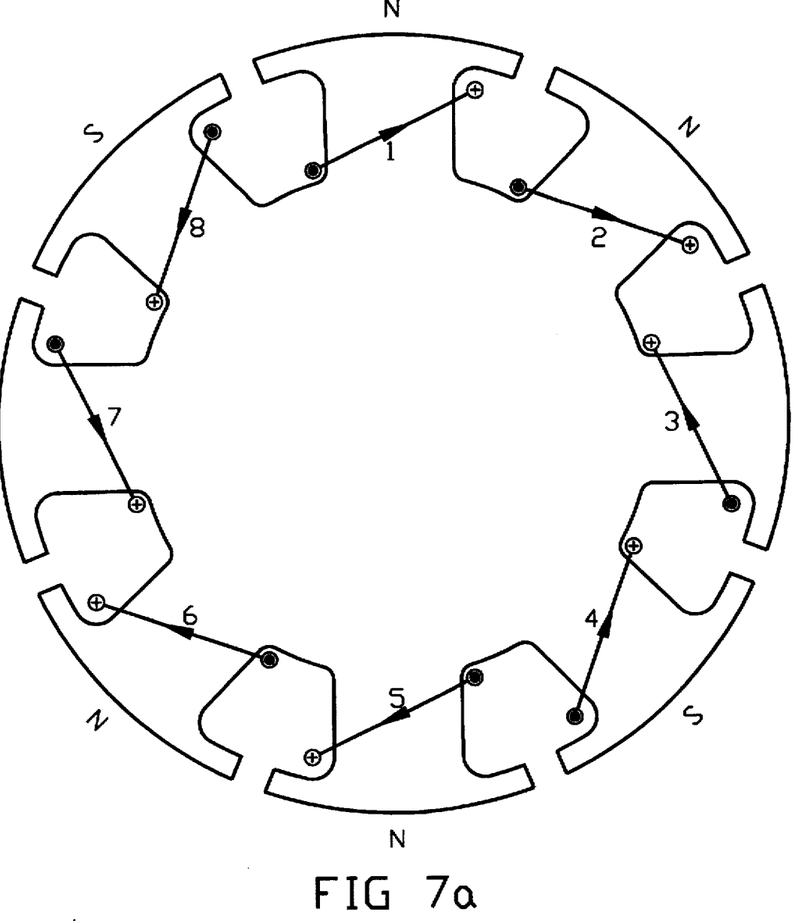
FIG. 7a provides a diagram similar to FIG. 6a, showing the operation of the rotor in a four-pole mode.
Figure 7B:
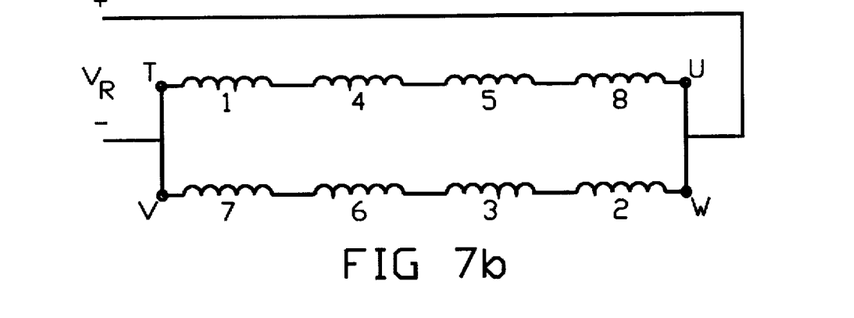
FIG. 7b provides a schematic diagram, similar to FIG. 6b, showing the connection of voltage to the rotor windings, for four-pole operation.

FIGS. 6a and 7a provide schematic diagrams of the windings formed on the rotor, according to the preferred embodiment of the invention, for eight-pole and four-pole operation, respectively. The rotor is driven with direct current, and includes windings labeled 1 through 8. The windings are arranged in two circuits, a first circuit including windings 1, 4, 5, and 8, and a second circuit including windings 2, 3, 6, and 7. A voltage is applied to the first circuit at terminals T and U, and a voltage is applied to the second circuit at terminals V and W. The polarity of the dc voltage applied at terminals T and U remains the same for both modes of operation (four-pole and eight-pole), but the polarity of the dc voltage applied at terminals V and W is reversed, as shown in the schematic diagrams of FIGS. 6b and 7b, when the mode is changed.

FIGS. 6a and 7a illustrate the arrangement of poles defined by the windings of the rotor. The notation of FIGS. 6a and 7a is the same as that used in FIGS. 4 and 5. FIGS. 6a and 7a reflect the fact that, during a change of mode, the polarities of windings 1, 4, 5, and 8 remain unchanged, while the polarities of the other windings are reversed. These figures also explicitly identify "north" and "south" poles. FIG. 6a shows that each winding defines a pole which is opposite to that of the adjacent winding, thereby creating eight poles on the rotor. FIG. 7a shows that pairs of windings define similar poles (both "north" or both "south"). In the latter case, the pair of windings behaves simply as a single north pole or a single south pole, the number of effective poles being determined by how many times the magnetic polarity changes from one polarity to the other. Thus, in FIG. 7a, the effective number of poles has been reduced by one-half, as compared with FIG. 6a. The same reasoning applies to the stator, as already discussed.

Figure 8:
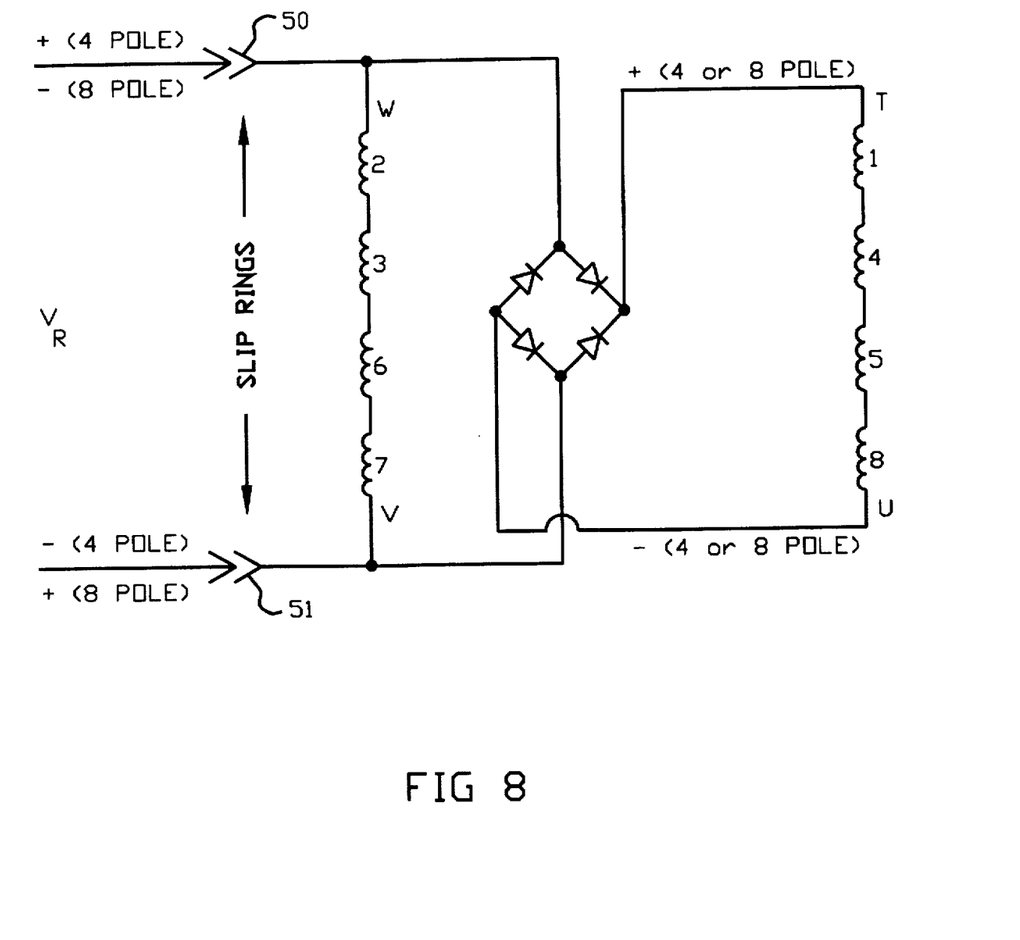
FIG. 8 provides a schematic diagram showing the connection of the rotor windings to a pair of slip rings, according to the present invention.

FIG. 8 provides a schematic diagram showing another aspect of the present invention, namely the minimization of the number of slip rings needed to power the rotor windings. FIG. 8 corresponds to FIGS. 6b and 7b, insofar as it shows rotor windings 1–8 and terminals T, U, V, and W. The windings are connected to a source of voltage through slip rings 50 and 51, the slip rings being illustrated symbolically as connectors. The circuit including windings 2, 3, 6, and 7 (and having terminals V and W) is connected directly to the slip rings. The circuit including windings 1, 4, 5, and 8 is connected to the voltage source through a bridge rectifier formed of four diodes, as shown.

When the polarity of the voltage applied to the slip rings is reversed, the voltage received by windings 1, 4, 5, and 8 is unchanged, due to the symmetry of the bridge rectifier. Thus, a reversal of polarity of the voltage applied to the slip rings causes reversal of polarity of the voltage applied across terminals V and W, but has no effect on the polarity of the voltage applied across terminals T and U. Thus, the circuit of FIG. 8 accomplishes the polarity changes indicated as required in FIGS. 6b and 7b.

The advantage of the arrangement of FIG. 8 is that, at the expense of using four diodes, one needs only two slip rings to apply the necessary voltages to both sets of windings. It is preferable to use two slip rings instead of four, because slip rings generate friction which unnecessarily reduces the output of the motor, and because slip rings also require space and tend to generate electrical noise. However, the invention can be practiced without the arrangement of FIG. 8, in which case additional slip rings would be required.

One can switch operating modes at any time, even while the motor is running, simply by changing the electronic drive to the windings. In general, when the motor is operating at low speeds, one prefers to use the multi-pole mode, and when the motor is operating at higher speeds, it is preferable to use the reduced-pole mode.

The embodiments described above are only exemplary, and not limiting. The reader skilled in the art will recognize other possible modifications, within the scope of the invention. For example, it is not absolutely necessary to provide eight windings per phase of the stator, or eight windings on the rotor. Instead of using eight poles, one could have other numbers of poles. What is important is the manner in which the effective number of poles can be reduced by one-half, by an electronic and non-mechanical adjustment. This and other modifications should be considered within the spirit and scope of the following claims.

What is claimed is:

1. A brushless DC electric motor comprising:
   a) a rotor and a stator, wherein the rotor has a plurality of windings and the stator has a plurality of windings,
   b) at least one electronic control signal connected to the windings of the stator, wherein the control signal applies a voltage across each winding of the stator such that the voltage across each winding has a polarity,
   c) a source of direct current connected to the windings of the rotor, wherein the direct current produces a voltage across each winding of the rotor such that the voltage across each winding of the rotor has a polarity, and
   d) means for varying said electronic control signal and said source of direct current, the varying means comprising means for reversing the polarity of the voltage across at least some of the windings of the stator, and for reversing the polarity of the voltage across at least some of the windings of the rotor,
   wherein the windings of the stator and the rotor define an effective number of magnetic poles, and wherein the varying means comprises means for electronically changing the effective number of magnetic poles of the stator and of the rotor.

2. The motor of claim 1, wherein the polarity reversing means comprises means for applying a predetermined voltage to some of the windings, and means for applying a voltage equal to the negative of said predetermined voltage to said some of the windings.

3. The motor of claim 2, wherein the predetermined voltage comprises a stepped pulse signal.

4. The motor of claim 2, wherein the stator windings are arranged in a plurality of phases, and wherein there is a polarity reversing means for each phase.

5. The motor of claim 2, wherein the windings of the rotor are arranged in first and second groups, wherein the first group of windings is connected directly to the source of direct current, and wherein the second group of windings is connected to a bridge rectifier which is connected to the source of direct current, wherein the bridge rectifier is connected to the source of direct current in parallel with the first group of windings.

6. The motor of claim 2, wherein the rotor has first and second groups of windings, each group of windings being arranged in series, the first and second groups of windings being connected in parallel to the source of direct current, wherein the first and second groups of windings are connected to the source of direct current through no more than two slip rings.

7. In a brushless DC electric motor having a rotor and a stator, both the rotor and stator having a plurality of windings, wherein the windings of both the rotor and the stator define a plurality of electromagnets having an effective number of magnetic poles,
   the improvement comprising:
      means for generating a time-varying control signal, the control signal being connected to the windings of the stator, wherein a voltage having a polarity is applied, by the control signal, across each winding of the stator,
      a source of direct current connected to the windings of the rotor, wherein a voltage having a polarity is applied across each winding of the rotor, and
      means for altering both the control signal and the source of direct current, wherein the altering means comprises means for electronically varying the effective number of magnetic poles of the rotor and the stator.

8. The improvement of claim 7, wherein the altering means comprises means for reversing polarity of a voltage applied to some of the windings.

9. The improvement of claim 8, wherein the polarity reversing means comprises means for applying stepped pulse signals to the windings.

10. The improvement of claim 7, wherein the stator windings are arranged in a plurality of phases, and wherein there is an altering means associated with each phase.

11. The improvement of claim 7, wherein the windings of the rotor are arranged in first and second groups, wherein the first group of windings is connected directly to the source of direct current, and wherein the second group of windings is connected to a bridge rectifier which is connected to the source of direct current, wherein the bridge rectifier is connected to the source of direct current in parallel with the first group of windings.

12. The improvement of claim 7, wherein the rotor has first and second groups of windings, each group of windings being arranged in series, the first and second groups of windings being connected in parallel to the source of direct current, wherein the first and second groups of windings are connected to the source of direct current through no more than two slip rings.

13. A high-speed constant-horsepower motor, the motor having a rotor comprising a plurality of windings, the windings being arranged in first and second groups, each group comprising a plurality of windings connected in series, the first group being connected directly across a voltage source, the second group being connected to a bridge rectifier which is also connected across the voltage source, and means for inverting a polarity of the voltage source, the inverting means comprising means for changing polarity of voltage across the first group of windings while leaving unchanged a polarity of voltage across the second group of windings.

14. A method of operating a motor, the motor including a rotor and a stator having a plurality of windings, the method comprising the steps of:
   a) applying a time-varying control signal to the windings of the stator, such that the windings of the stator form a predetermined number of effective magnetic poles, wherein the control signal produces a voltage across each stator winding, said voltage having a polarity,
   b) applying a source of direct current to the windings of the rotor, wherein the source of direct current produces a voltage across each rotor winding, said voltage having a polarity, and
   c) reversing the polarity of at least some of the stator windings and at least some of the rotor windings so as to change the effective number of magnetic poles, the reversing step being performed entirely by electronic means.

* * * * *